US006993551B2

(12) United States Patent
Whikehart et al.

(10) Patent No.: US 6,993,551 B2
(45) Date of Patent: Jan. 31, 2006

(54) SPARSE-COEFFICIENT FUNCTIONS FOR REDUCING COMPUTATIONAL REQUIREMENTS

(75) Inventors: J. William Whikehart, Novi, MI (US); Christopher John Hagan, Colorado Springs, CO (US)

(73) Assignee: Visteon Global Technologies, Inc., Dearborn, MI (US)

( * ) Notice: Subject to any disclaimer, the term of this patent is extended or adjusted under 35 U.S.C. 154(b) by 591 days.

(21) Appl. No.: 10/122,453

(22) Filed: Apr. 12, 2002

(65) Prior Publication Data

US 2003/0195914 A1 Oct. 16, 2003

(51) Int. Cl.
*G06F 7/52* (2006.01)
(52) U.S. Cl. .................................................... 708/620
(58) Field of Classification Search ......... 708/620–632
See application file for complete search history.

(56) References Cited

U.S. PATENT DOCUMENTS

| 4,276,607 | A | 6/1981 | Wong |
| 5,548,839 | A | 8/1996 | Caldwell et al. |
| 5,617,480 | A | 4/1997 | Ballard et al. |
| 5,712,628 | A | 1/1998 | Phillips et al. |
| 5,727,074 | A | 3/1998 | Hildebrand |
| 5,732,107 | A | 3/1998 | Phillips et al. |
| 5,732,337 | A | 3/1998 | Wargnier et al. |
| 5,841,684 | A | 11/1998 | Dockser |
| 5,859,878 | A | 1/1999 | Phillips et al. |
| 5,867,535 | A | 2/1999 | Phillips et al. |
| 5,963,153 | A | 10/1999 | Rosefield et al. |
| 6,058,148 | A | 5/2000 | Whikehart et al. |
| 6,072,994 | A | 6/2000 | Phillips et al. |
| 6,178,211 | B1 | 1/2001 | Whikehart et al. |
| 6,256,358 | B1 | 7/2001 | Whikehart et al. |

FOREIGN PATENT DOCUMENTS

| EP | 0 766 388 A3 | 1/1998 |
| WO | WO 88/8567 | 11/1988 |

OTHER PUBLICATIONS

Linda et al., A reduced-space half-band filter design on an Actel FPGA, 2001, IEEE, pp. 1237-1240.*
Reid et al., Canonical signed digit representation for FIR digital filters, 2000, IEEE, pp. 416-426.*
Sangjin et al., Low power parallel multiplier design for DSP applications through coefficient optimization, 1999, IEEE, pp. 286-290.*

* cited by examiner

Primary Examiner—Kakali Chaki
Assistant Examiner—Chat C. Do
(74) Attorney, Agent, or Firm—Brinks Hofer Gilson & Lione

(57) ABSTRACT

A method for reducing computational steps in a digital processor including multiplications producing a plurality of multiplication products. This method specifies a desired multiplication function to be implemented in a digital processor, the desired multiplication function having a respective set of initial coefficients corresponding to each digital multiplier stage of the multiplication function. An initial total number of non-zero bits of the initial coefficients is determined and the initial coefficients are modified. Further, a resulting number of non-zero bits in the modified set of coefficients is quantified. Finally, the modified set of coefficients that result in a reduced number of non-zero bits as compared to the initial coefficients is chosen. The new modified coefficients are implemented in the device by constructing the digital multiplier stages with the modified coefficients. Thus, the digital processor performs a desired multiplication function using "sparse" coefficients to achieve a reduced execution time or lower implementation cost for a given signal conditioning function.

6 Claims, 4 Drawing Sheets

SPARSE-COEFFICIENT FUNCTIONS FOR REDUCING COMPUTATIONAL REQUIREMENTS

TECHNICAL FIELD

The present invention relates to digital signal processing and methods for increasing the speed or efficiency of such processors.

BACKGROUND

Digital signal processors are processors specifically designed to handle digital signal processing tasks. Such devices have seen exponential growth over the last decade in consumer products such as cellular phones, automobile radios, voice recognition devices, scientific instrumentation, etc. Digital processors are used in such applications because of the intensive math computations that are required. The execution speed of most DSP algorithms is limited almost completely by the number multiplications and additions required.

In real time processing where digital processors are most useful, an output signal is produced the same time that the input signal is being acquired. In many applications utilizing DSP's, the output information must be immediately available after the input signal is received, although a short delay is permissible. For example, a ten millisecond delay in a telephone call is not detectable by the speaker or listener. Similarly, a few second delay in the radar signal processing before the signal is displayed is negligible. In such real time applications a sample of a signal is received, an algorithm executed, and an output sample transmitted, with this process occurring over and over. Alternatively, a group of samples may be received as a group, processed as a group and then transmitted as a group of samples.

Functions such as filters and mixers in DSP systems require signal samples to be multiplied by precalculated coefficients. In the case of a filter such as a FIR or IIR filter, the coefficients are the typical FIR and IIR coefficients, and in the case of a mixer, they are the set of values representing a mixer injection signal.

In the prior art, multipliers used to implement such filters and mixers are sometimes designed such that for any part of the multiplier where the signal is being multiplied by a zero bit in the coefficient, the multiplication was not actually performed. For example, if the coefficient was 0.5, with the binary representation of 010000000 (for an 8-bit coefficient), only multiplication due to the non-zero bit would be performed. Typically, multiplications carried out for the non-zero bits are sometimes implemented by shift-and-add techniques. As previously indicated, it would be advantageous to reduce the number of non-zero bits to in turn reduce the number of multiplications required. Accordingly, the fewer multiplications required in a DSP algorithm the faster or more efficiently the algorithm will execute.

Alternatively, for a function that is to be executed within a fixed time period, computational resources, such as multipliers, can be shared for use by different parts of the function if those computational resources are made faster by reducing the number of non-zero bits. Thus, the required computational resources to perform the whole function are reduced. An example is a filter, where one multiplier may perform all of the multiplications required to implement the filter. A reduction in required computational resources results in a more efficient and thus lower cost implementation of the function.

Finally, in the implementation of a desired function, a reduction in the number of non-zero bits of any coefficients required to implement the function will result in a reduction in the required digital logic and thus the cost required to implement the function.

Therefore what is needed is a new and improved method for reducing the number of non-zero bits in values, such as filter and mixer coefficients used in multiplication operations in DSP algorithms. Such an algorithm should have a reduced execution time or lower implementation cost while having little to no affect on the quality or usability of the output signal.

SUMMARY

In an aspect of the present invention, a method for reducing computational steps in a digital processor including shift-and-add digital multiplier stages producing a multiplication product is provided. This method specifies a desired multiplication function to be implemented in a digital processor, the desired multiplication function having respective initial coefficients corresponding to each shift-and-add digital multiplier stage of the multiplication function. In an aspect of the method of the present invention an initial total number of non-zero bits of the initial coefficients is determined and the initial coefficients are scaled by a selected scale factor or scaling factor. In another aspect of this method a resulting number of non-zero bits in the scaled initial coefficients is quantified. Thereafter, the selected scale factor is modified and the resulting number of non-zero bits of the scaled initial coefficients re-determined. Finally, the selected scale factor that results in a reduced number of non-zero bits as compared to the initial coefficients is chosen. The new coefficients are implemented in the device by constructing the shift-and-add digital multiplier stages with the initial coefficients scaled by the selected final scale factor. Accordingly, the chosen final scale factor results in the lowest number of non-zero bits of the scaled initial coefficients.

In still another aspect of the present invention a correction factor in response to an inverse of the final scale factor is determined and the correction factor is applied to the final product outside of the shift-and-add digital multiplier stages. The selected scale factor is varied between 0.5 and about 2. Thus, the digital processor performs a desired multiplication function using "sparse" coefficients to achieve a reduced execution time or lower implementation cost for the given signal conditioning function.

These and other aspects and advantages of the present invention will become apparent upon reading the following detailed description of the invention in combination with the accompanying drawings.

DETAILED DESCRIPTION

Figure 1:
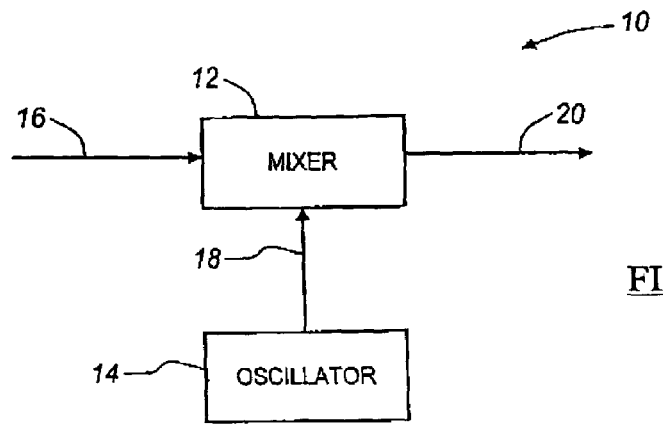
FIG. 1 is a block diagram of a typical frequency translator.

The present invention provides a method for minimizing the number of non-zero bits in precalculated coefficients of various signal conditioning functions, such as filters and mixers in digital signal processor (DSP) based systems. The coefficients are adjusted in such a way that the effect of the coefficient adjustment on the overall function (e.g. a mixer) is negligible or correctible with additional processing steps.

In one embodiment of the present invention, a coefficient adjustment method is provided for function coefficients such as for mixer injection signals, FIR filter coefficients, and feed-forward coefficients of IIR filters wherein the gain of the coefficients is changed. In other words, the coefficients are scaled by the same factor. A scaling factor close to "1" may be used to achieve minimal non-zero bits in the coefficients and have a negligible effect on the overall function. However, if the effect on the overall function is not negligible, a correcting gain multiplier may be added either before or after the function. Depending on the original coefficient set, small scaling changes can cause many bits to change in the coefficients.

In an embodiment of the present invention, a search method for determining the appropriate scale factors with which to multiply or scale the coefficients is provided. More specifically, depending on the basic function (e.g. an FIR filter) a search process or method utilizing a range of scale factors to arrive at the scaled coefficients for each function and the resulting non-zero coefficient bits.

In another embodiment of the present invention, a search method is provided that adjusts the function coefficients independently to reduce the number of non-zero bits. The effect on the overall function is observed. Accordingly, if the overall function retains its required characteristics (i.e. minimized error in the frequency response relative to a target frequency response for a filter) the adjustment is permissible. Thus, this alternate method may be utilized to independently adjust the coefficients of a filter. However, if more stringent function characteristics are desired, a compensation means may be implemented external of the digital signal processing function. The compensation means may be, for example, an additional multiplication step or other mathematical operation or additional function that counteracts or compensates for the effects on the processed signal caused by adjusting the initial coefficients.

The compensation means should act in conjunction with the modified function within the digital processor such that the combination of the modified function (having the adjusted coefficients) and the compensation means produces a resulting combined function. The modified function is the function resulting from the use of the modified coefficients. Moreover, the combined function has one or more characteristics that are improved over those of the modified function.

Improved characteristics, for example, for a mixer injection is a level of the injection signal that is at least above a certain minimum level so that the signal-to-noise ratio of the injection is above a certain level. In calculating the signal to noise ratio, the signal injection is considered the injection, and the noise may be due to truncation while performing calculations such as multiplication.

Examples of improved characteristics, for a filter are a flatter pass band, a steeper transition band, and a lower stopband. As know in the prior art, the passband passes desired signals, the stopband attenuates undesired signals, and the transition band is the frequency band between the edge of the passband and the edge of the stopband.

The above examples also apply to the part of the method where the bits are minimized to create the modified function. However, the particular limits would be different. For example, while searching to minimize the number of bits, a filter passband may be allowed to have a flatness to within 6 dB (i.e. 6 db ripple), to allow a significant drop in the number of non-zero bits. However, the actual performance of the filter may require 3 dB maximum ripple, so the compensation would be added to flatten out the passband to a 3 dB or less ripple. This compensation would be in the form of another filter.

To gain a better understanding of the features, advantages and operation of the present invention, a frequency translator will be described will serve as one environment in which the method of the present invention may be applied. With specific reference to FIG. 1, a frequency translator 10 is illustrated. Frequency translator 10 has a mixer device 12 and an oscillator 14. Typically, an input signal 16 is received by mixer 12 and combined with an injection signal 18 generated by oscillator 14. Therefore, the output signal 20 is a combination of the input signal 16 and injection signal 18. The signals and processing may be comprised of real components only, solely complex components, or mixed real and complex components.

Figure 2:
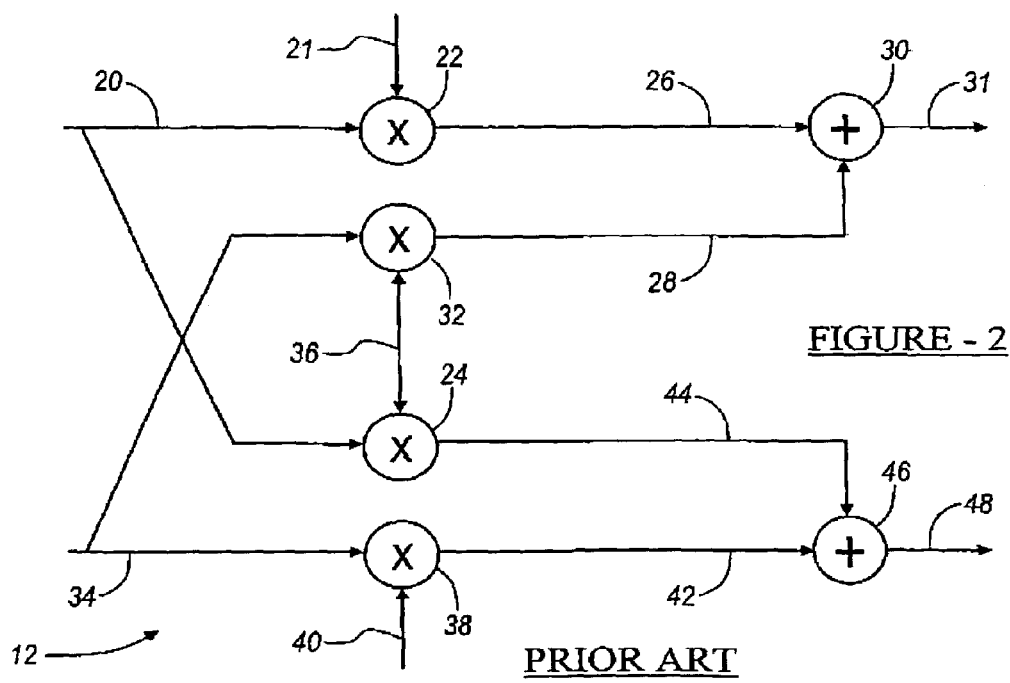
FIG. 2 is a signal flow diagram of a typical mixer used in the frequency translator.

Referring now to FIG. 2, mixer 12, which may be a full complex mixer, is illustrated, in accordance with the present invention. The real part 21 of input signal 16 is received by a first multiplier 22 and a second multiplier 24. A real part of injection signal 18 is also received by multiplier 22. A combined signal 26 is added to a combined imaginary signal 28 in adder 30 to produce a real part of an output signal 31.

A combined imaginary signal 28 is produced by a third multiplier 32 which receives an imaginary part 34 of input signal 16 and an imaginary part 36 of injection signal 18. Second multiplier 24 combines the real part 21 of input signal 16 and an imaginary part 36 of injection signal 18 to produce a combined signal 49. A fourth multiplier 38 receives the imaginary part 34 of input signal 16 and combines that signal with a real part 40 of injection signal 18 to produce a combined signal 42. Combined signal 42 is added to combined signal 44 at an adder 46 to produce an imaginary part 48 of output signal 20.

In a particular application of mixer 12, the frequency of injection ($f_{inj}$) signal 18 is fixed. The injection signal may be set to a sub-multiple of the input signal sampling rate ($f_s$). For example, $$f_{inj} = \frac{f_s}{4}.$$

Then the real part of the injection signal is the sequence (1, 0, −1, 0 . . . ) and the imaginary part of the injection signal is the sequence (0, 1, 0, −1 . . . ). In this scenario, no multiplication is required and only negation and multiplexing would be required to achieve the combined oscillator/mixer function.

However, if an injection signal of $$\frac{f_s}{8}$$

is desired, the injection signal sequences would also contain the values of sin $$\left(\frac{\pi}{4}\right)$$

and −sin $$\left(\frac{\pi}{4}\right)$$

or (±0.7071). These values of course would require actual multiplication.

Typically, this multiplication can be performed using shift-and-add operations. Generally, the number of adds required is determined by the number of "non-zero" or "1" bits in the coefficient that is multiplied by the signal. Given a desired coefficient accuracy of N bits, it would be desirable to minimize the number of "1" or non-zero bits within the N bits.

For example, for N=16, the value 0.7071 has six "1" bits and thus requires five adds. However, the other coefficients of the $$\frac{f_s}{8}$$

sequences do not require any adds, since those coefficients are 0, 1, and −1.

The present invention provides a method for reducing the number of adds required for any coefficient of a function having a $$f_{inj} = \frac{f_s}{n}$$

and a given N. The method starts by finding a value "k" which is a real number between 0.5 and 1 such that a modified coefficient sequence requires the least number of adds for any sequence values. The modified sequence could be described by the following expression:

$I'(n)=k \cdot I(n)$ and $Q'(n)=k \cdot Q(n)$.

In the preceding equation "I(n)" is the original real part of the sequence and "Q(n)" is original imaginary part of the coefficient sequence, and "k" is a constant scaling factor which is not equal to "1".

Multiplying by the scaling factor will cause the level of the output signal to be different than the level originally desired. However, compensation can be added to the system to overcome this difference. This compensation may be performed earlier or later in a lower speed processing stage, thus requiring less overall processing bandwidth. Alternately, the difference in the level of the output signal and the level of the originally desired output signal may be low enough to be acceptable without compensation.

Moreover, both positive and negative versions of a coefficient sequence should be considered when searching for the least number of non-zero bits, since a negative version of a coefficient may have less bits than the positive version or vice versa. If the negative version of a coefficients is needed, a negation can be incorporated into the output adders of the mixer.

Figure 3:
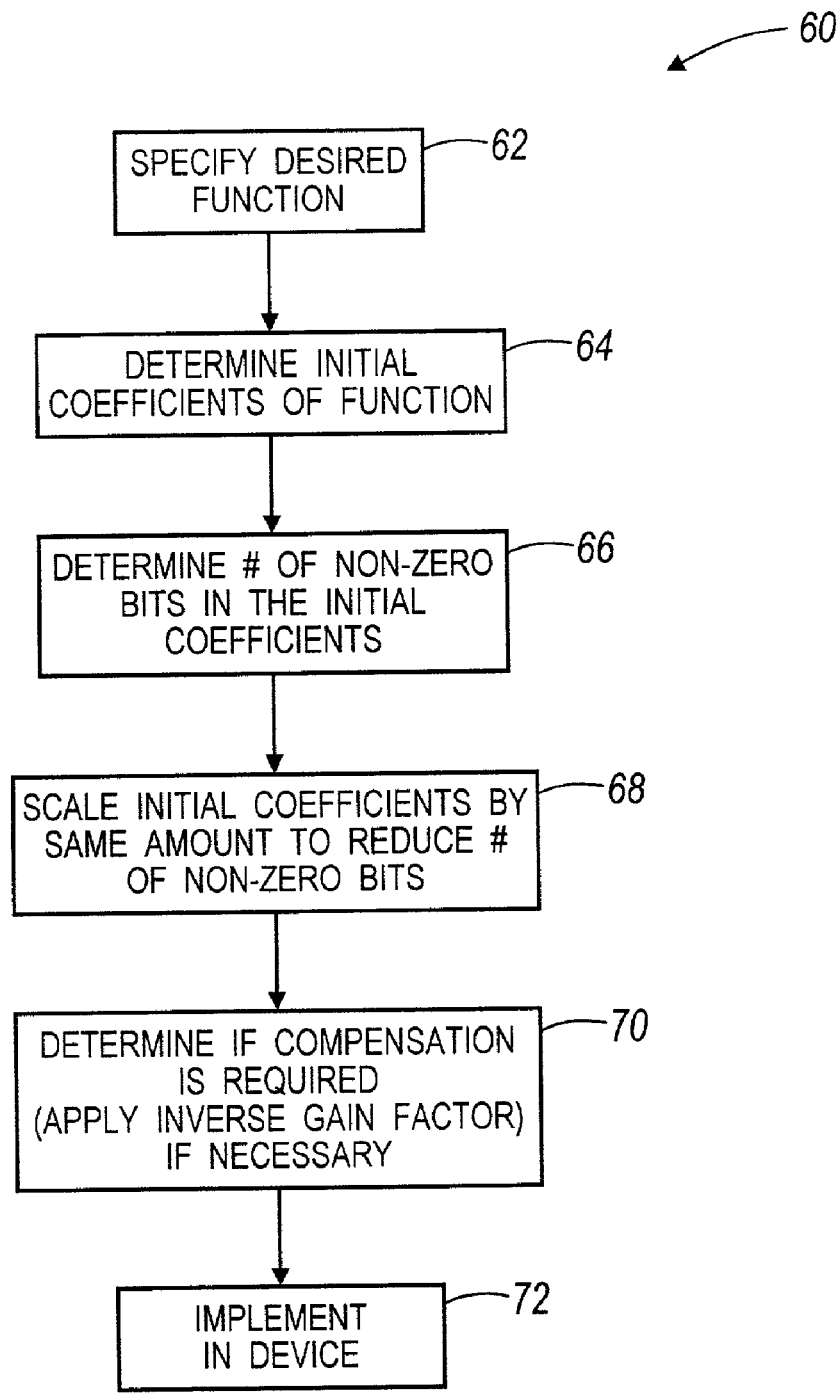
FIG. 3 is a flow chart illustrating the method of the present invention.

Referring now to FIG. 3, the method of the present invention is illustrated in flow chart form, in accordance with the present invention. The method starts at block 62 wherein a desired signal processing function is specified. The initial coefficients of the function are determined, as representative of block 64. At block 66, the number of non-zero bits in the initial coefficients are determined. The initial coefficients are then scaled by the same amount to reduce the number of non-zero bits, as represented by block 68. At block 70 a compensation factor is determined to counteract the effects of the scaling factor on the output signal, if necessary. The adjustments to the initial coefficients would then be implemented in the device, as represented by block 72.

Figure 4:
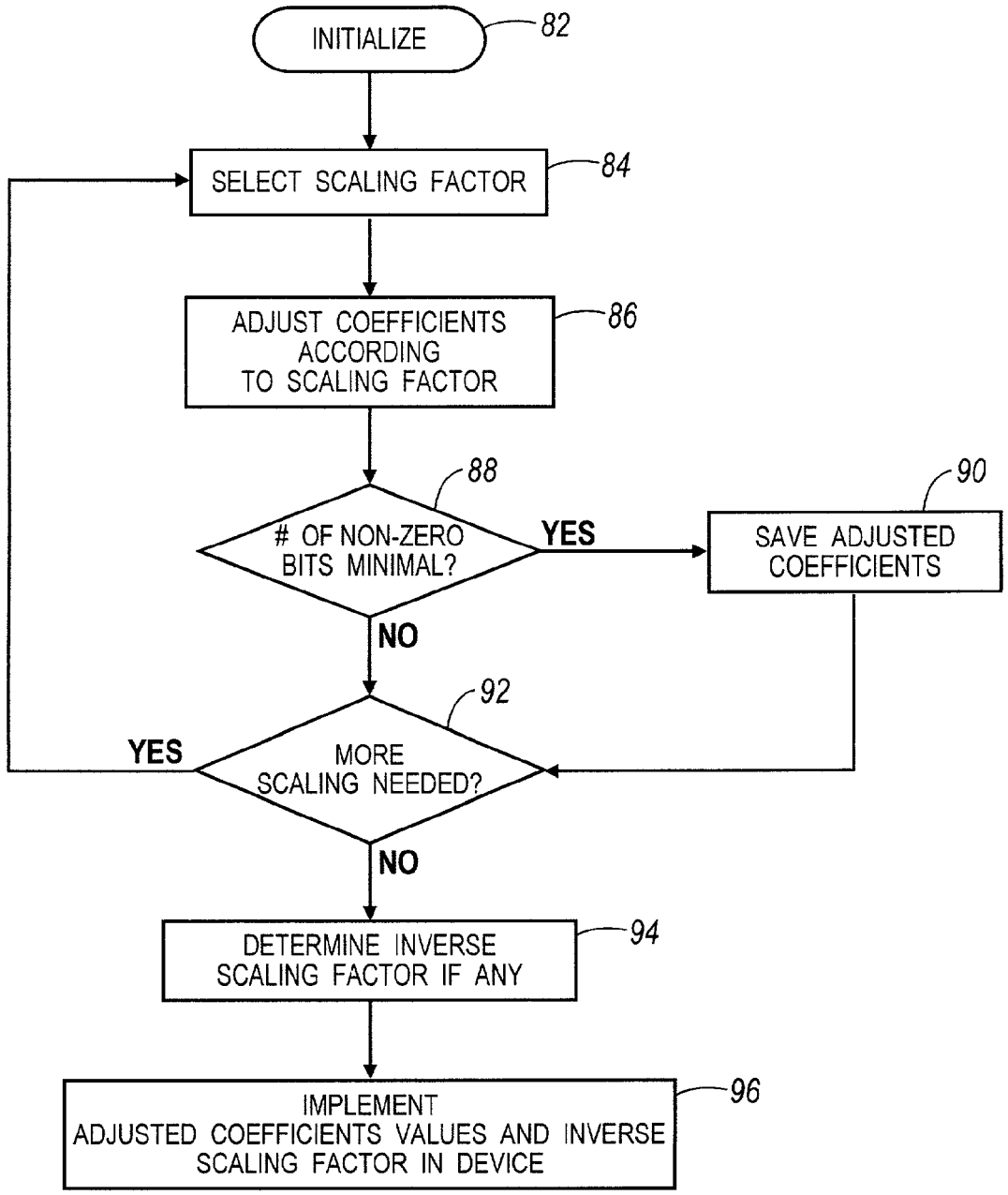
FIG. 4 is a flow chart illustrating a search method for identifying a scaling factor to minimize the number of non-zero bits in a coefficient sequence.

Referring now to FIG. 4, a search method 80 for identifying a scaling factor "k" that will minimize the number of non-zero bits in a coefficient sequence is shown, in accordance with the present invention. Method 80 is initialized at block 82. A scaling factor is selected, as represented by block 84. At block 86, the coefficients are adjusted according to the scaling factor. The number of non-zero bits are evaluated to determine if there are a minimal number of non-zero bits present in the coefficient sequence. If the number of non-zero bits are not at a minimum, then at block 92 the value of the scaling factor is evaluated. If it is determined that more scaling is needed then a different scaling factor is selected, at block 84. However, if the number of non-zero bits are at a minimum, then the adjusted coefficients are saved, as represented by block 90. Accordingly, at block 92 if it is determined that more scaling is not required, then an inverse scaling factor is determined, if needed, at block 94. Finally, at block 96, the adjusted coefficients and inverse scaling factor are implemented in the device.

A more specific example of a method for reducing the number of non-zero bits in the coefficients of a function will now be described in order to provide a more complete understanding of the present invention. For example, if the desired signal conditioning function is a mixer, as described previously having an injection signal frequency of $$\frac{f_s}{8},$$

then the coefficient sequence of this function would be 1, −1, 0.7071, and −0.7071. For N=16 and assuming only positive coefficients are used (if a separate negation step for the −0.7071 coefficient is used), the total number of non-zero bits in one injection cycle is 26. To execute this sequence, that consists of 8 coefficients, 26 adds are required in a shift-and-add multiplier. If a scaling factor "k" of $1/\sqrt{2}$ (0.7071067812) is used to adjust the values of the coefficients, the total number of non-zero bits is reduced to 16. Thus, the present invention greatly reduces the number of non-zero bits and thus the execution time of the function.

Figure 5:
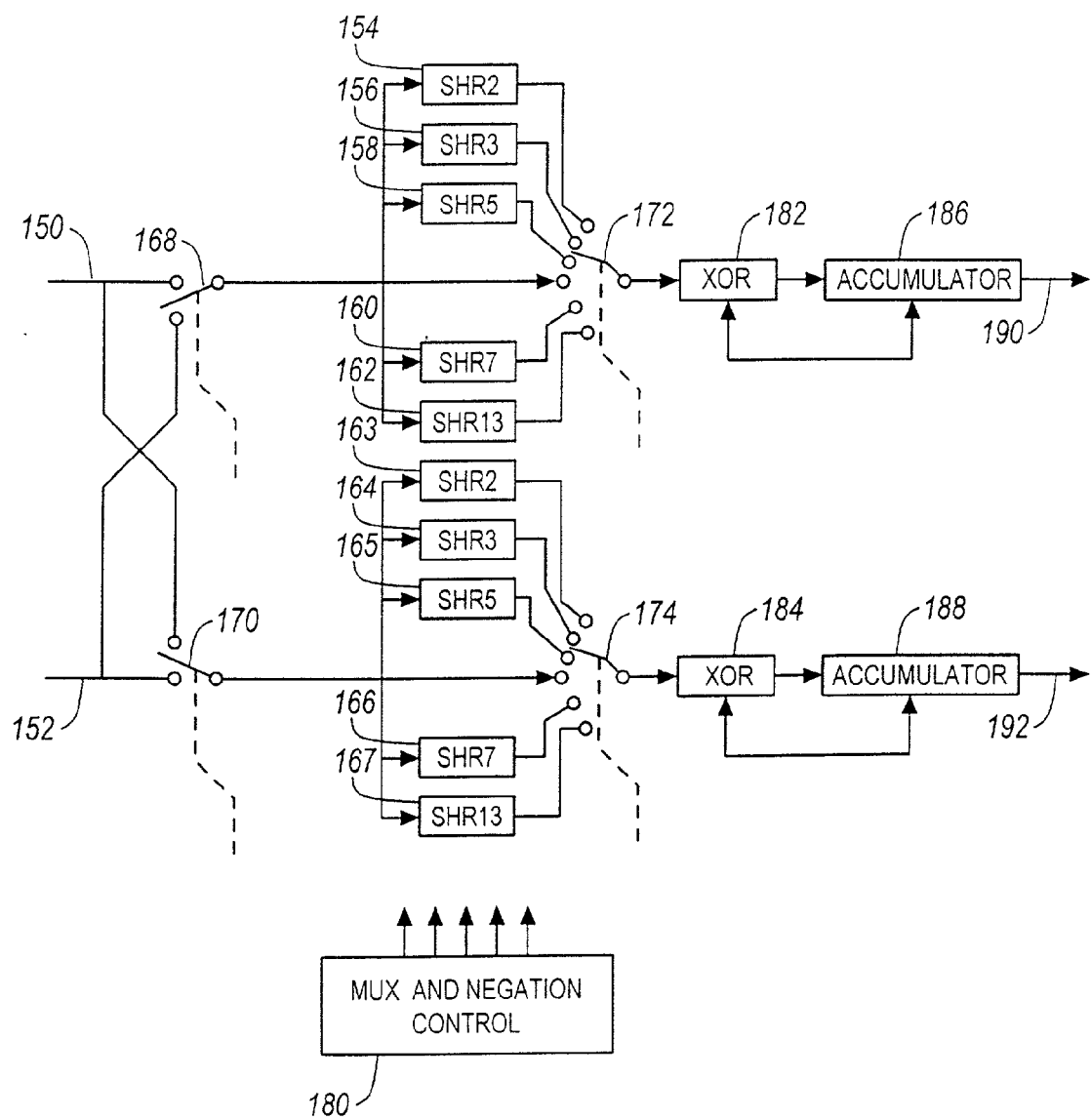
FIG. 5 is a block diagram illustrating a hardware implementation of a frequency translator having an $f_{inj}=f_s/8$ and N=16, in accordance with the present invention.

Referring now to FIG. 5, the hardware implementation of the mixer having an injection signal frequency of ⅛ of the frequency of the sampling rate and a coefficient accuracy of N=16 bits is illustrated. The real part of the input signal is received on line 150 and the imaginary part of the input signal is received on line 152. Shift right blocks 154 through 167 in operation with switches 168 through 174 provide the shift-and-add function. Accordingly, switches 168 through 174 are in communication with multiplexing and negation control device 180 for controlling the shift-and-add operations. As illustrated negation is accomplished by bit inversion at XOR blocks 182, 184 and by adding a "1" to the LSB of signal values stored in accumulators 186, 188 (carry input on accumulator). Further, a "0" may be introduced at the output 190 and/or 192 by either stopping the accumulator from accumulating or by providing a "0" input from multiplexer device 180.

The desired real part of the output signal is transmitted on line 190 while the desired imaginary part of the output signal is transmitted on line 192. Thus, this hardware implementation provides the desired output signal with a certain acceptable amount of error in its level due to scaling of the function coefficients. Accordingly, the desired function executes substantially quicker than a function that does not have scaled coefficients as determined by the method of the present invention.

In another embodiment of the present invention, a method for searching "k" for a given N is provided. A first step is to run a counter from $2^{N-2}$ to $2^{N-1}$. The scaling factor "k" would then be set to the counter value divided by $2^{N-1}$, thus "k" will range in value from 0.5 to 1 with a resolution based on N. For each new value of "k" the number of "1" bits or "non-zero" bits in all the coefficients of the coefficient sequence to complete one cycle is determined. For each of the negative coefficients of the original sequence, the absolute value of the coefficient is used, and the negation is performed separately as previously discussed. This determination continues for all the values of the count. The "k" corresponding to the least number of "non-zero" bits is used to modify the coefficients of the particular function. Finally, the modified coefficients are implemented in the DSP device.

Thus, the present invention has many advantages and benefits of the prior art. For example, the present invention reduces the number of multiplications required in a particular function by adjusting the coefficients of the function to reduce the number of non-zero bits. Thus, the present invention reduces processing time and as a result processing costs. Moreover, the present invention has negligible impact on the output signal and provides a means for compensating the adjustment made to the coefficient sequence.

As any person skilled in the art of digital signal processing will recognize from the previous detailed description and from the figures and claims, modifications and changes can be made to the preferred embodiments of the invention without departing from the scope of this invention defined in the following claims.

What is claimed is:

1. A method for reducing computational steps in a digital processor having multiplication operations that produce a plurality of multiplication products, wherein the multiplication operations are used to carry out a desired signal processing function having predefined characteristics, said method comprising: specifying at least one multiplication operation, wherein the desired signal processing function has an associated set of initial coefficients for implementing the function; determining an initial total number of non zero bits of tile associated set of Initial coefficients; modifying the set of initial coefficients to generate a plurality of sets of modified coefficients by scaling all the coefficients in the set of initial coefficients by a common scale factor, wherein the common scale factor has a value varying between about 0.5 and about 2; choosing a set of modified coefficients such that the resulting number of nonzero bits is reduced and that the predefined characteristics of the function are achieved; and implementing the function in the digital processor using the set of modified coefficients.

2. The method of claim 1 further comprising introducing a compensation means within the digital processor, said compensation means acting in conjunction with the function having the modified coefficients within the digital processor such that the combination of the function having the modified coefficients and the compensation means produces a resulting combined function, said modified function being the function resulting from the use of the modified coefficients, and said combined function having characteristics that are improved over the characteristics of the modified function.

3. A method for reducing computational steps in a digital processor including digital multiplication operations that produce a plurality of multiplication products, wherein the multiplication operations are used to carry out a desired signal processing function, said method comprising: specifying desired signal processing function has an associated set of initial coefficients for implementing the function; determining an initial total number of non zero bits in the initial coefficients; scaling said initial coefficients by a selected scale factor having a value varying between about 0.5 and about 2; determining a resulting number of non zero bits of the scaled initial coefficient; modified the selected scale factor and re determining the resulting number of non zero bits of the scaled initial coefficients; choosing as a final scale factor resulting in a reduced in the number of nonzero bits of the scaled initial coefficients; and constructing the multiplication function with the initial coefficients scaled by the final scale factor.

4. The method of claim 3 further comprising determining a correction factor in response to an inverse of the final scale factor, and applying the correction factor to the signal outside of the multiplication function.

5. A method for reducing computational steps in a digital processor including shift and add digital multiplier stages producing a multiplication products, said method comprising: specifying a desired function to be implemented in the digital processor, the desired function having respective initial coefficients corresponding to each shift and add digital multiplier stage of the function; determining an Initial total number of non zero bits of initial coefficients; scaling said initial coefficients by a selected scale factor having a value varying between about 0.5 and about 2; determining a resulting number of non zero bits of the scaled initial coefficients: modifying the selected scale factor and re determining the resulting number of non zero bits of the scaled initial coefficients; choosing as a final scale factor the selected scale factor resulting in a reduced number of non zero bits of the scaled initial coefficients; and constructing the shift and add digital multiplier stages with the initial coefficients scaled by the final scale factor.

6. The method of claim 5 further determines a correction factor in response to an inverse of the final scale factor; and applying the correction factor to the signal outside of the multiplication function.

* * * * *

UNITED STATES PATENT AND TRADEMARK OFFICE
CERTIFICATE OF CORRECTION

PATENT NO. : 6,993,551 B2  Page 1 of 1
DATED : January 31, 2006
INVENTOR(S) : J. William Whikehart et al.

It is certified that error appears in the above-identified patent and that said Letters Patent is hereby corrected as shown below:

<u>Column 8,</u>
Line 3, after "factor" delete "," and substitute -- ; --.
Line 8, after "non zero bits of" insert -- the --.

Signed and Sealed this

Twenty-third Day of May, 2006

JON W. DUDAS
*Director of the United States Patent and Trademark Office*